US008913064B2

(12) United States Patent
McNeely et al.

(10) Patent No.: US 8,913,064 B2
(45) Date of Patent: Dec. 16, 2014

(54) REAL-TIME TERRAIN ANIMATION SELECTION

(75) Inventors: Brian McNeely, Redmond, WA (US); Dean Russell, Redmond, WA (US)

(73) Assignee: Nintendo Co., Ltd., Kyoto (JP)

(*) Notice: Subject to any disclaimer, the term of this patent is extended or adjusted under 35 U.S.C. 154(b) by 702 days.

(21) Appl. No.: 13/160,372

(22) Filed: Jun. 14, 2011

(65) Prior Publication Data

US 2011/0304630 A1 Dec. 15, 2011

Related U.S. Application Data

(60) Provisional application No. 61/354,664, filed on Jun. 14, 2010.

(51) Int. Cl.
G06T 13/00 (2011.01)
G06T 13/20 (2011.01)

(52) U.S. Cl.
CPC ......... *G06T 13/20* (2013.01); *A63F 2300/1075* (2013.01); *A63F 2300/6607* (2013.01)
USPC ....................................................... 345/473

(58) Field of Classification Search
None
See application file for complete search history.

(56) References Cited

U.S. PATENT DOCUMENTS

| 5,287,446 | A | 2/1994 | Williams et al. |
| 5,577,185 | A | 11/1996 | Tunnell et al. |
| 5,592,609 | A | 1/1997 | Suzuki et al. |
| 6,108,010 | A | 8/2000 | Boezeman et al. |
| 6,155,926 | A | 12/2000 | Miyamoto et al. |
| 7,587,274 | B2 | 9/2009 | Kaldewey et al. |
| 8,212,820 | B2 | 7/2012 | Shimura et al. |
| 8,257,173 | B2 | 9/2012 | Bergelt et al. |
| 2002/0050982 | A1 | 5/2002 | Ericson |
| 2002/0065133 | A1 | 5/2002 | Nagayama |
| 2004/0012594 | A1 | 1/2004 | Gauthier et al. |
| 2004/0259637 | A1 | 12/2004 | Kimura et al. |
| 2006/0071915 | A1 | 4/2006 | Rehm |
| 2006/0094502 | A1* | 5/2006 | Katayama et al. ............. 463/31 |
| 2007/0202949 | A1 | 8/2007 | Kawade et al. |
| 2008/0078758 | A1 | 4/2008 | Shimura et al. |
| 2010/0211244 | A1 | 8/2010 | Jeong et al. |
| 2011/0246875 | A1 | 10/2011 | Parker et al. |

(Continued)

OTHER PUBLICATIONS

Gillian Smith et al, Rhythm-Based Level Generation for 2D Platformers, Apr. 2009, ICFDG'09.*

(Continued)

*Primary Examiner* — Kee M Tung
*Assistant Examiner* — Xin Sheng
(74) *Attorney, Agent, or Firm* — Nixon & Vanderhye, P.C.

(57) ABSTRACT

In-game characters select the proper animation to use depending on the state of the terrain on which they are currently moving. In this specific case the character chooses an animation depending on the angle of the ground on which it is walking. The method involves real-time determination of the ground angle which is then used to choose the most desirable animation from a closed set of pre-created animations. The animation set consists of animations rendered with the character moving on flat terrain, as well as animations rendered of the character moving uphill and downhill (separately) at predetermined angles. In this game an animation set consisted of the following animations: 0 degrees, 15 degrees uphill, 30 degrees uphill, 45 degrees uphill, 15 degrees downhill, 30 degrees downhill, 45 degrees downhill). Drawing of the animation is offset to give the best appearance relative to the ground angle.

21 Claims, 17 Drawing Sheets

(56) References Cited

U.S. PATENT DOCUMENTS

2011/0304638 A1 12/2011 Johnston
2011/0304651 A1 12/2011 Shimura et al.
2012/0169593 A1 7/2012 Mak et al.

OTHER PUBLICATIONS

Kate Compton et al, Procedural Level Design for Platform Games, 2006, American Association for Artificial Intelligence.*
Ashmore et al, The Quest in a Generated World, 2007, Authors & Digital Games Research Association (DiGRA).*
Nitsche et al, Designing Procedural Game Spaces: A Case Study, 2006, FuturePlay.*
Office Action dated Apr. 17, 2014 issued in connection with U.S. Appl. No. 13/303,529, filed Nov. 23, 2011.
"SimCity 3000" Amazon.com. Online. Accessed via the Internet. Accessed Dec. 14, 2012. <URL:http://www.amazon.com/SimCity-3000-Pc/dp/B00000G161/ref=sr_1_1?ie=UTF8&qid=1355505436>.
"SimCity 3000 Manual" Electronic Arts. 1998. Accessed via the Internet. Accessed Dec. 14, 2012. <URL:http://www.replacementdocs.com/download.php?view.813>.
Mario vs. Donkey Kong 2: March of the Minis (released Sep. 25, 2006) <URL:http://www.mariowiki.com/Mario_vs._Donkey_Kong_2:_March_of_the_Minis>.
"Mario vs. Donkey Kong 2: March of the Minis Review." YouTube video, 9:57. Posted by "dashthegamer," Jun. 22, 2009. https://www.youtube.com/watch?v=AOUOGZGKXig.
"Mario vs DK 2 March of the minis (video example #4)." YouTube video, 3:25. Posted by "Xmooth," Oct. 5, 2006. https://www.youtube.com/watch?v=gKcqHb-k6cs.
Mario vs. Donkey Kong: Minis March Again! (released Jun. 8, 2009) <URL:http://www.mariowiki.com/Mario_vs._Donkey_Kong:_Minis_March_Again!>.
"Mario vs Donkey Kong: Mini's March Again—DSiWare Launch Trailer (NA)." YouTube video, 1:28. Posted by "WiiloveitTV," Jun. 18, 2009. https://www.youtube.com/watch?v=1ku7OwqqqFI.

* cited by examiner

*Exemplary Illustrative Game Play Platform*

*Exemplary Illustrative Game Play Platform Block Diagram*

REAL-TIME TERRAIN ANIMATION SELECTION

CROSS-REFERENCES TO RELATED APPLICATIONS

This application claims priority to U.S. Provisional Application No. 61/354,664, filed Jun. 14, 2010, the entire contents of which is hereby incorporated by reference.

STATEMENT REGARDING FEDERALLY SPONSORED RESEARCH OR DEVELOPMENT

Not applicable.

FIELD

The technology herein relates to user interfaces for interacting with a computer and more specifically to graphical 3D user interfaces. Still more specifically, the technology herein relates to techniques for selecting proper animation to use depending on state of the terrain on which a graphical object is currently moving.

BACKGROUND AND SUMMARY

In the past, virtual landscape design at each level was fixed and predetermined. Some past video games such as Nintendo's Pikmin provided randomness in dynamically changing or constructing aspects of virtual game levels and associated landscapes. However, further improvements are possible.

To make virtual game terrain more interesting and dynamically created, the technology herein provides that in-game characters select the proper animation to use depending on the state of the terrain on which they are currently moving. In this specific case, the character chooses an animation depending on the angle of the ground (e.g., the orientation of the structure relative to virtual gravity) on which it is walking. The method involves real-time determination of the ground angle which is then used to choose the most desirable animation from a closed set of pre-created animations. The animation set consists of animations rendered with the character moving on flat terrain, as well as animations rendered of the character moving uphill and downhill (separately) at predetermined angles. In this game an animation set consisted of the following animations: 0 degrees, 15 degrees uphill, 30 degrees uphill, 45 degrees uphill, 15 degrees downhill, 30 degrees downhill, 45 degrees downhill). Drawing of the animation is offset to give the best appearance relative to the ground angle.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Exemplary Real-Time Terrain Animation Selection

Figure 1A:
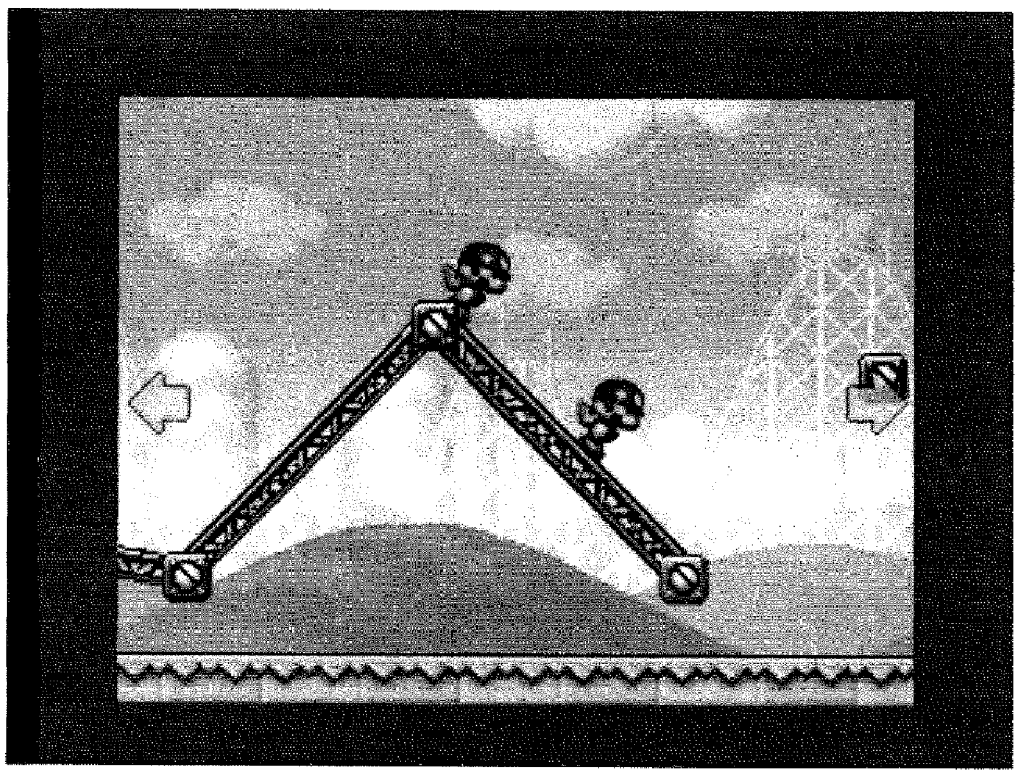
FIGS. 1A-1N show exemplary screen shots of exemplary illustrative non-limiting game play.
Figure 1B:
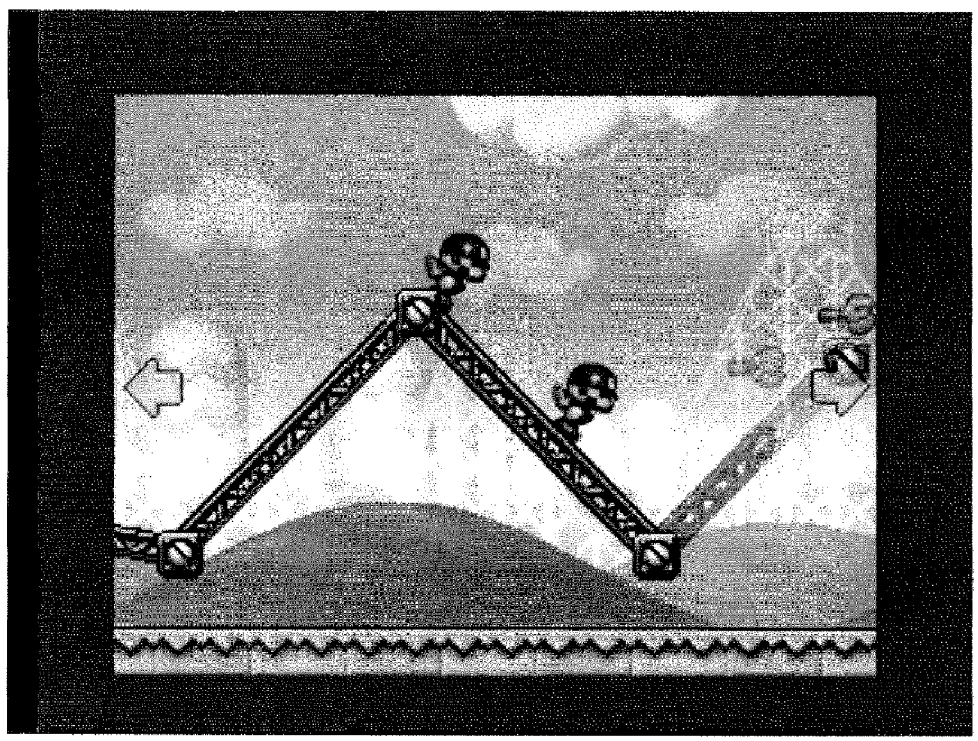
Figure 1C:
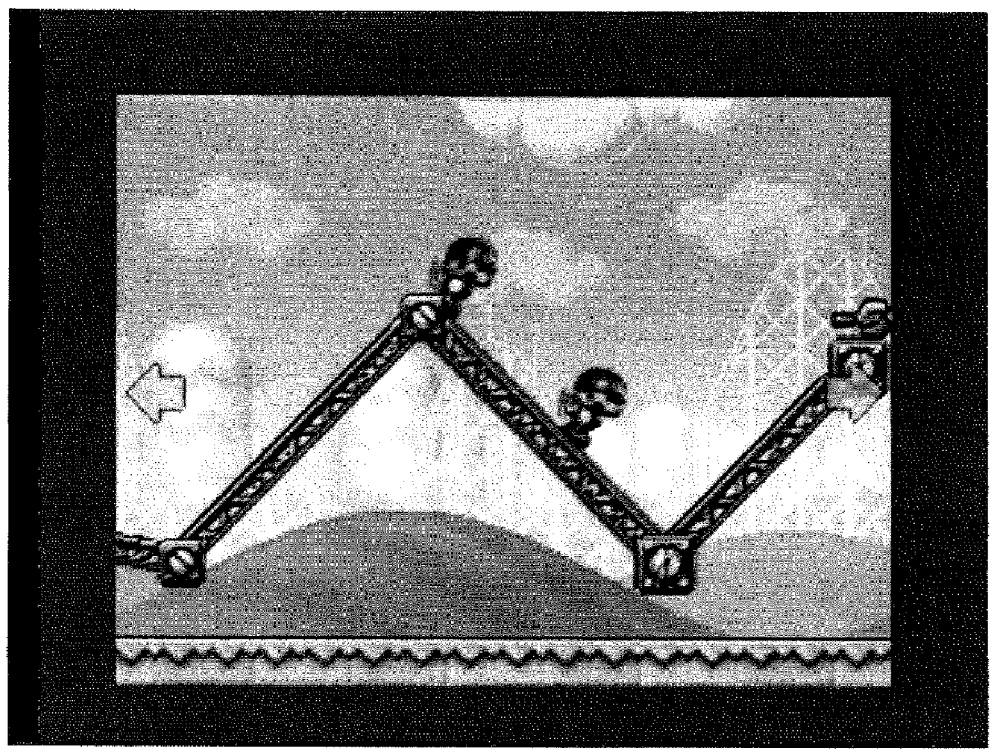
Figure 1D:
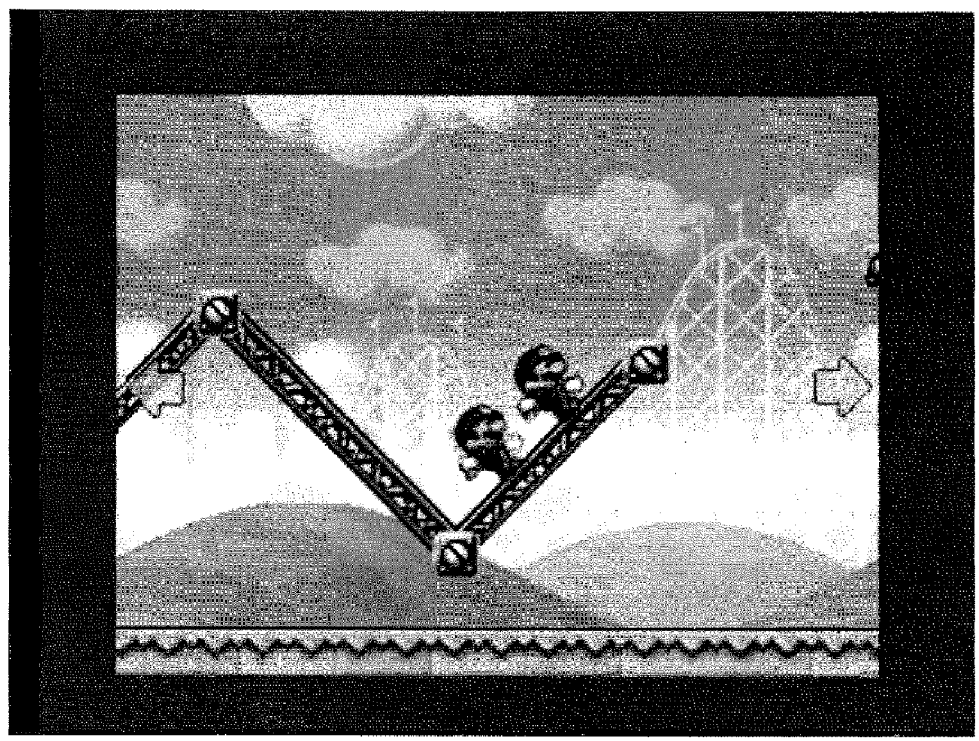
Figure 1E:
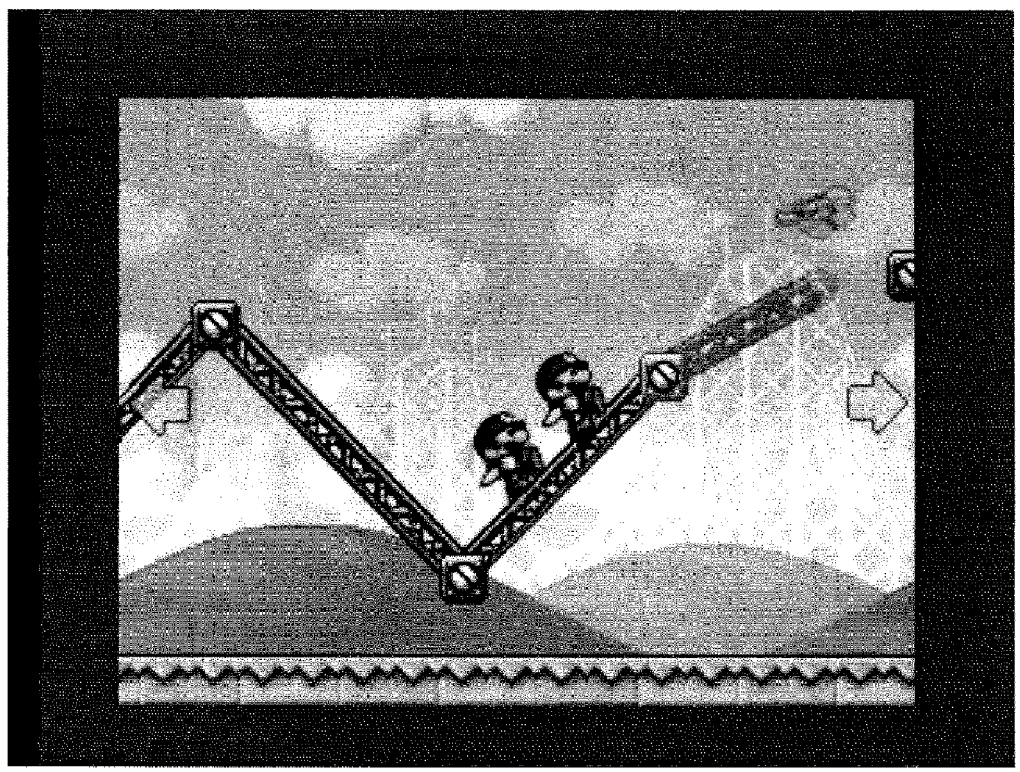
Figure 1F:
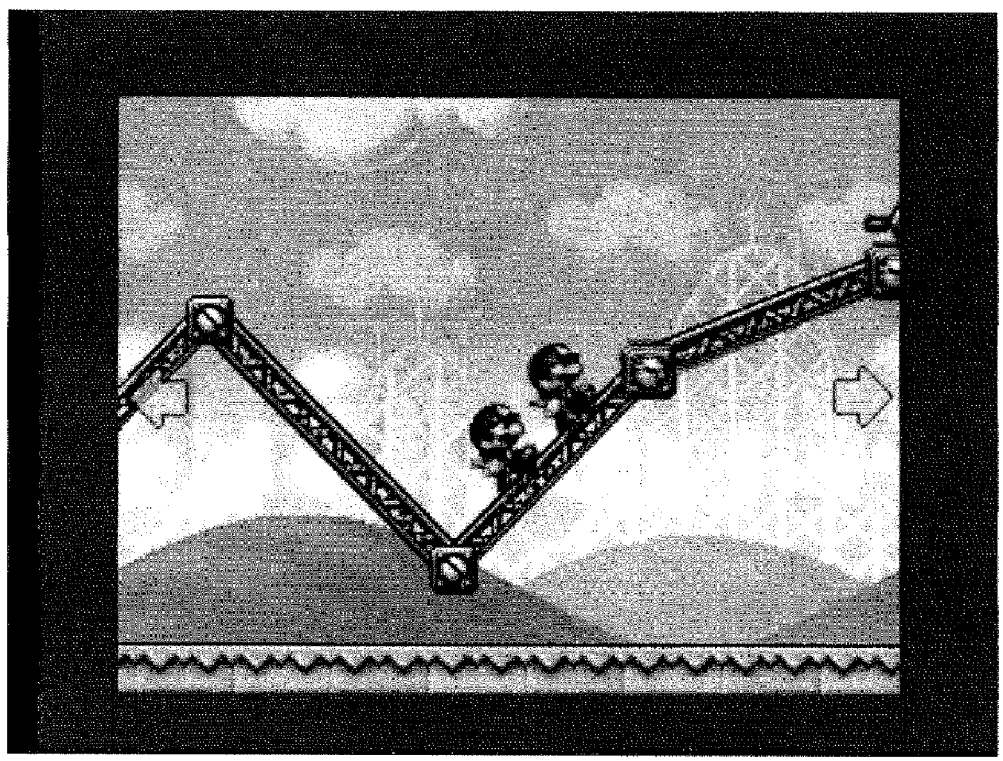
Figure 1G:
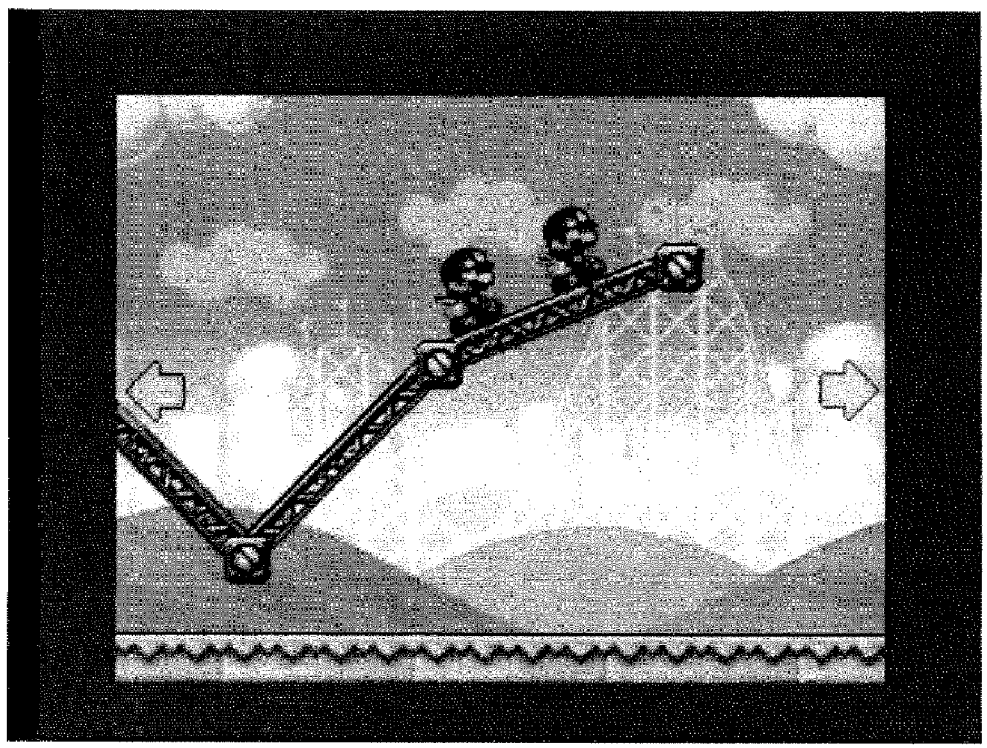
Figure 1H:
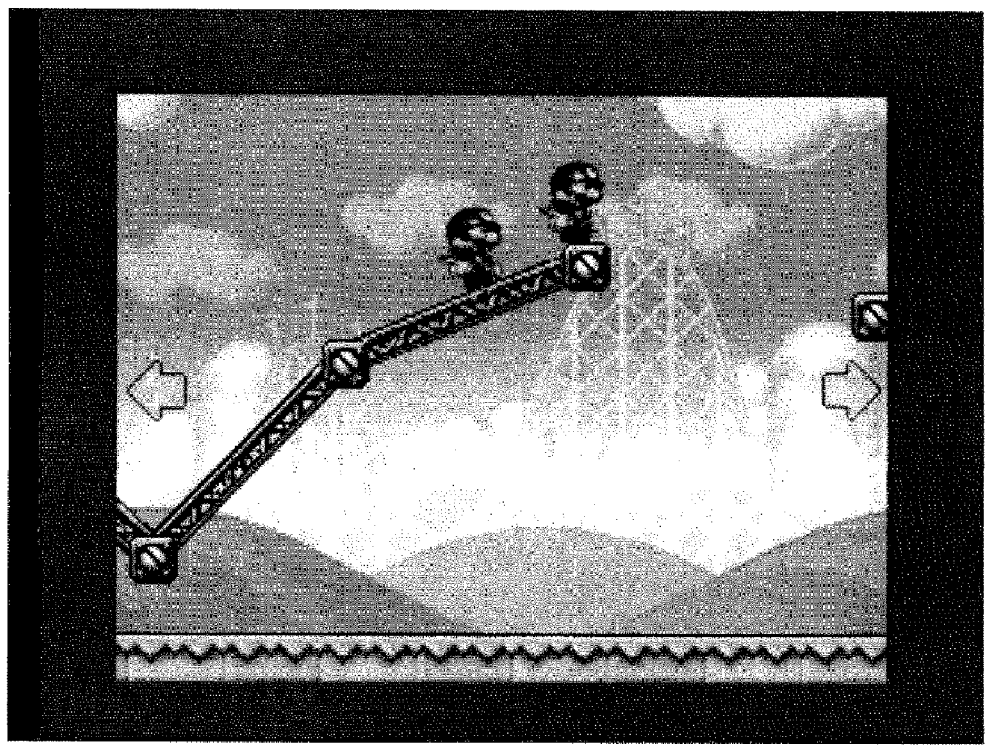
Figure 1I:
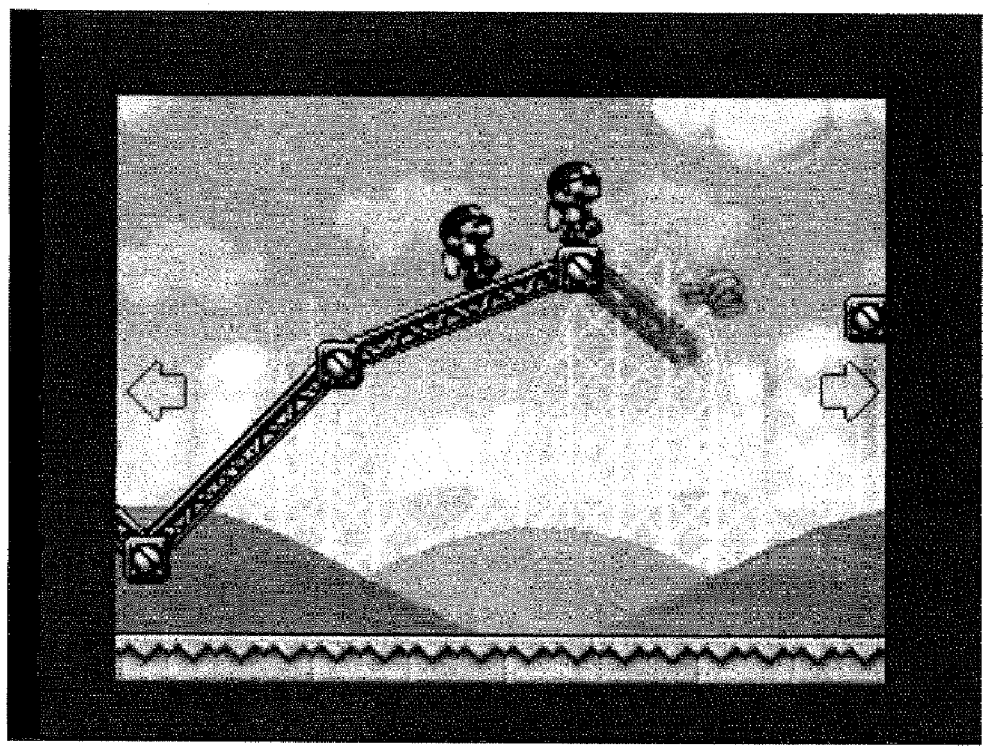
Figure 1J:
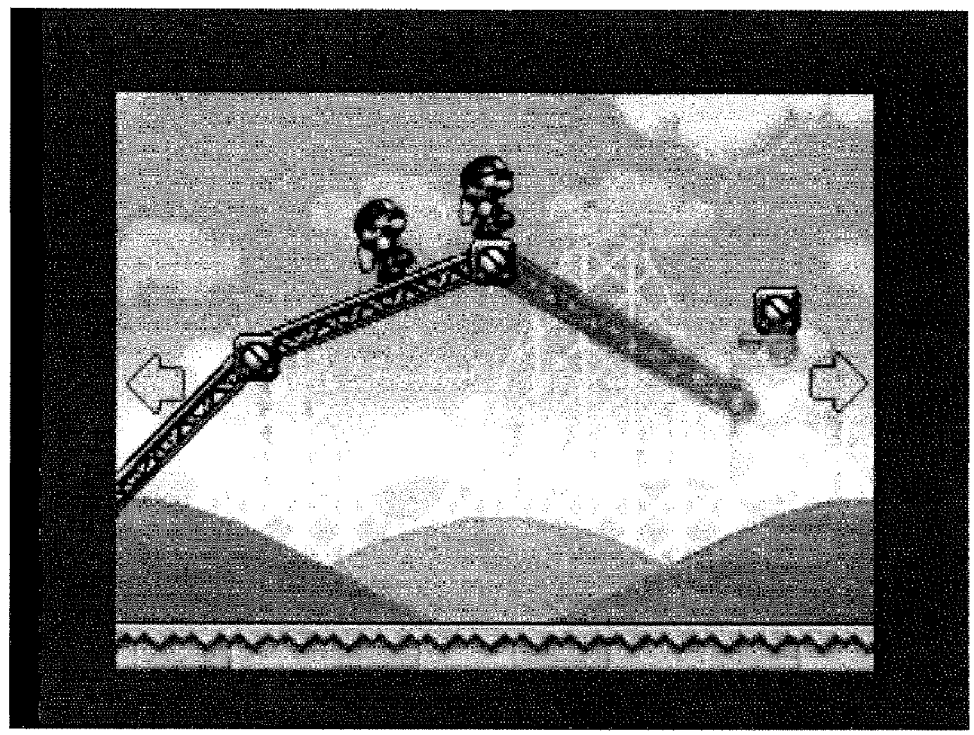
Figure 1K:
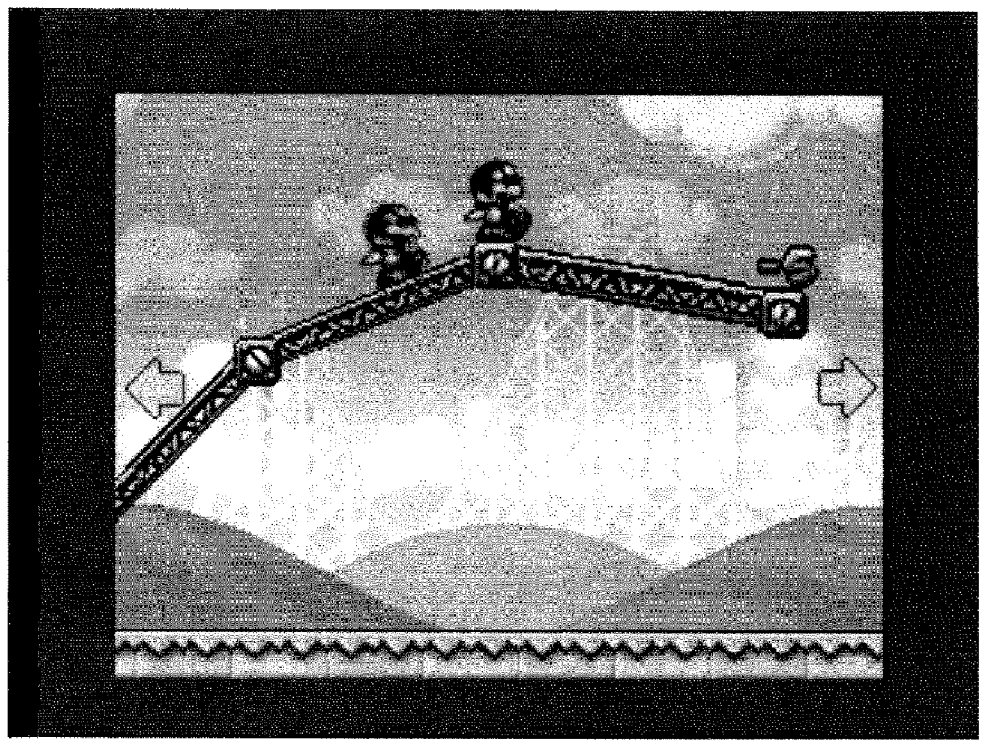
Figure 1L:
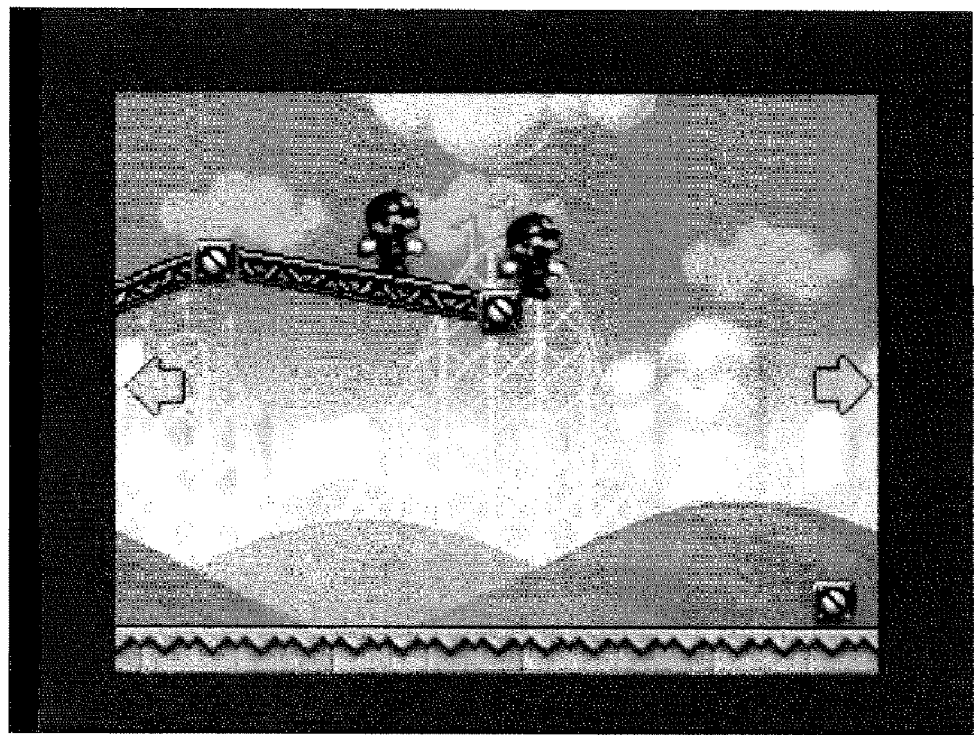
Figure 1M:
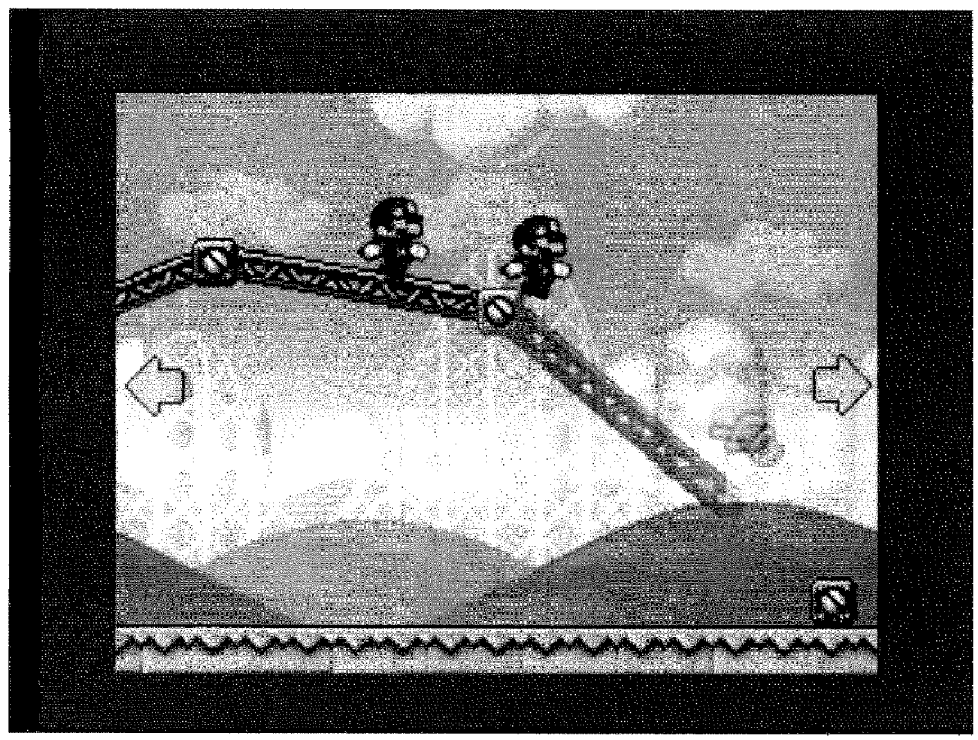
Figure 1N:
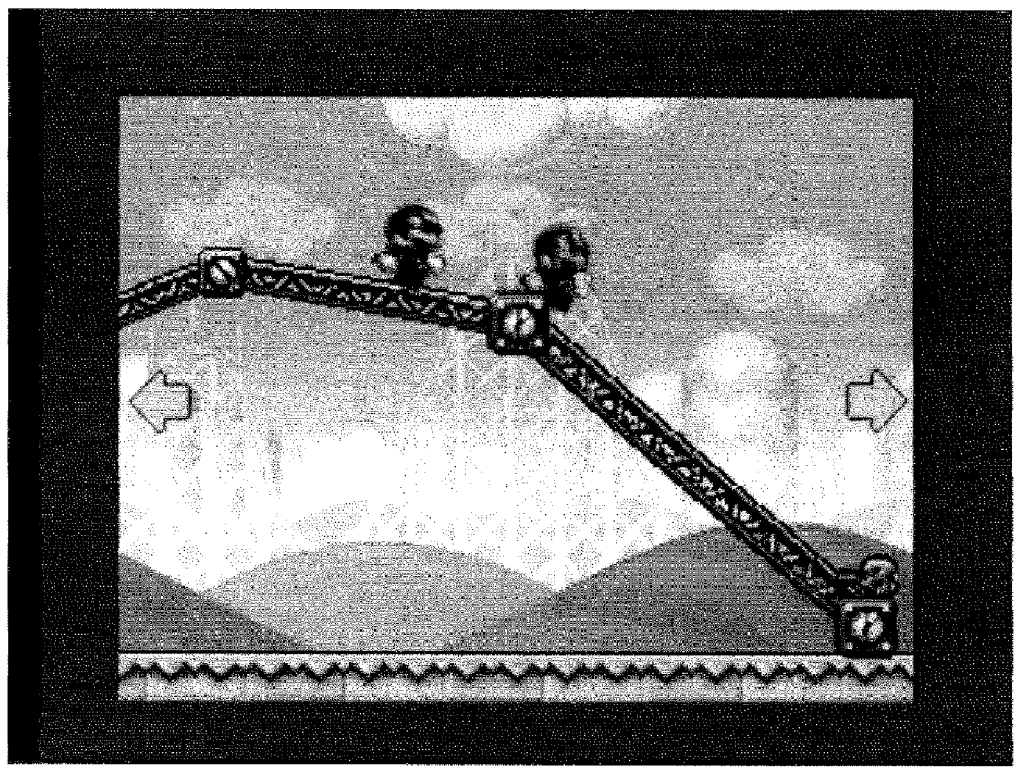

In one exemplary non-limiting illustrative implementation shown in FIGS. 1A-1N, in-game characters (e.g., the two Mario characters shown in FIG. 1A) select the proper animation to use depending on the state of the terrain on which they are currently moving. In the case of FIG. 1A, the characters are moving down a sloped girder having an angle of approximately 45 degrees downhill. The game system determines in real time the surface angle on which the game characters are travelling. Then, the system uses this surface angle to choose or select a desirable animation from a closed set of pre-created animations. For example, FIG. 1B shows the next segment of the structure being dynamically created with an angle that requires the game characters to climb rather than descend (since they are already descending) and with a selected angle that is also 45 degrees but this time uphill and a somewhat shorter length (see FIG. 1C).

As the game characters travel up the new girder segment (see FIG. 1D), the system uses the new segment angle and length to select the next segment (see FIG. 1E)—in this case a segment that has about the same length but (since the game characters are already up) a still upward but more gentle slope such as 30 degrees uphill (see FIG. 1F). As the game characters travel this new segment (see FIG. 1G, 1H), the system uses the angle of the most currently added segment to determine the angle of the next segment (in this case 15 degrees downhill) (see FIG. 1I, 1J, 1K).

Once the game characters reach the send of this most recently added segment (FIG. 1L), the system uses the angle of that last-added segment to determine the angle and extent of the next segment (see FIG. 1M, 1N)—in this case a 45-degree downwardly-sloped structure that returns the game characters to ground level.

In the exemplary game play shown above, the system provides a real time determination of the angle at which the game characters are currently travelling, which is then used to choose the most desirable animation from a closed set of pre-created animations. For example, the animation set may consist of animations rendered with the characters moving on flat terrain, as well as animations rendered of the character moving uphill and downhill (separately) at predetermined angles such as 0 degrees, 15 degrees uphill, 30 degrees uphill, 45 degrees uphill, 15 degrees downhill, 30 degrees downhill, 45 degrees downhill). Drawing of the animation is offset to give the best appearance relative to ground angle. The newly added structures may be conditioned also to eventually return the characters to a desired level such as ground.

Exemplary Video Game Platform

Figure 2A:
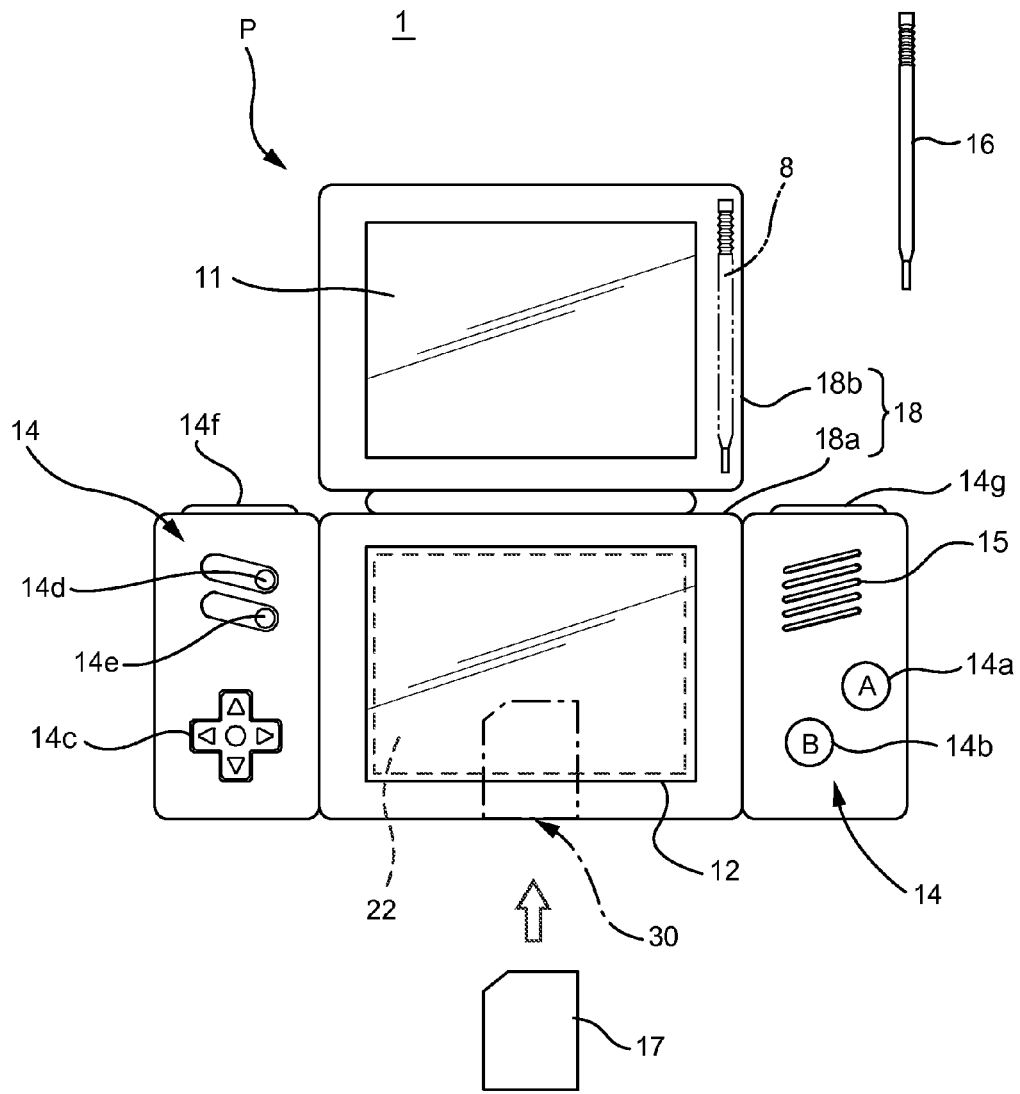
FIG. 2A is an exemplary external view of an exemplary illustrative non-limiting game apparatus for executing a game program.

In FIG. 2A, an exemplary illustrative non-limiting game apparatus 1 that can be used for implementing the virtual suction tool technique described above. In one exemplary illustrative non-limiting implementation, system 10 may comprise a Nintendo DS portable handheld videogame system including a 3D graphics generator capable of generating complex texture-mapped displays of characters interacting with a 3D world from any desired viewpoint.

In the exemplary non-limiting illustrative implementation shown, game device 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b.

The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18a in the horizontal direction. One of two side sections of the lower housing 18a interposing the second LCD 12 has speaker holes 9 of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 2A. The operation switch section 14 also includes a direction indication switch (cross key) 14c, a start switch 14d, and a select switch 14e which are attached to one main surface of the side section of the lower housing 18a to the left of the second LCD 12 as seen in FIG. 2A. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 2A) of the second LCD 12, a touch panel 13 (surrounded by the dashed line in FIG. 2A) is provided. The touch panel 13 is of, for example, any of a resistance film system, an optical (infrared) system, and a static capacitance coupling system. When a stylus 16 (or a finger) presses, moves on, or touches an upper surface of the touch panel 13, the coordinate position of the stylus 16 is detected and the coordinate data is output.

In the vicinity of a side surface of the upper housing 18b, an accommodation hole 8 (an area represented by the two-dot chain line in FIG. 2A) is formed when necessary for accommodating the stylus 16 for operating the touch panel 13. In a part of one surface of the lower housing 18a, a cartridge insertion section 30 (an area represented by the one-dot chain line in FIG. 2A) is formed, for detachably accepting a game cartridge 17 (hereinafter, referred to simply as the "cartridge 17") having a built-in memory (e.g., a ROM) which stores a game program. The cartridge 17 is a memory medium storing a game program, and is, for example, a nonvolatile semiconductor memory such as a ROM or a flash memory. A part of the lower housing 18a inner to the cartridge insertion section 30 has a built-in connecter (see FIG. 2B) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 2B:
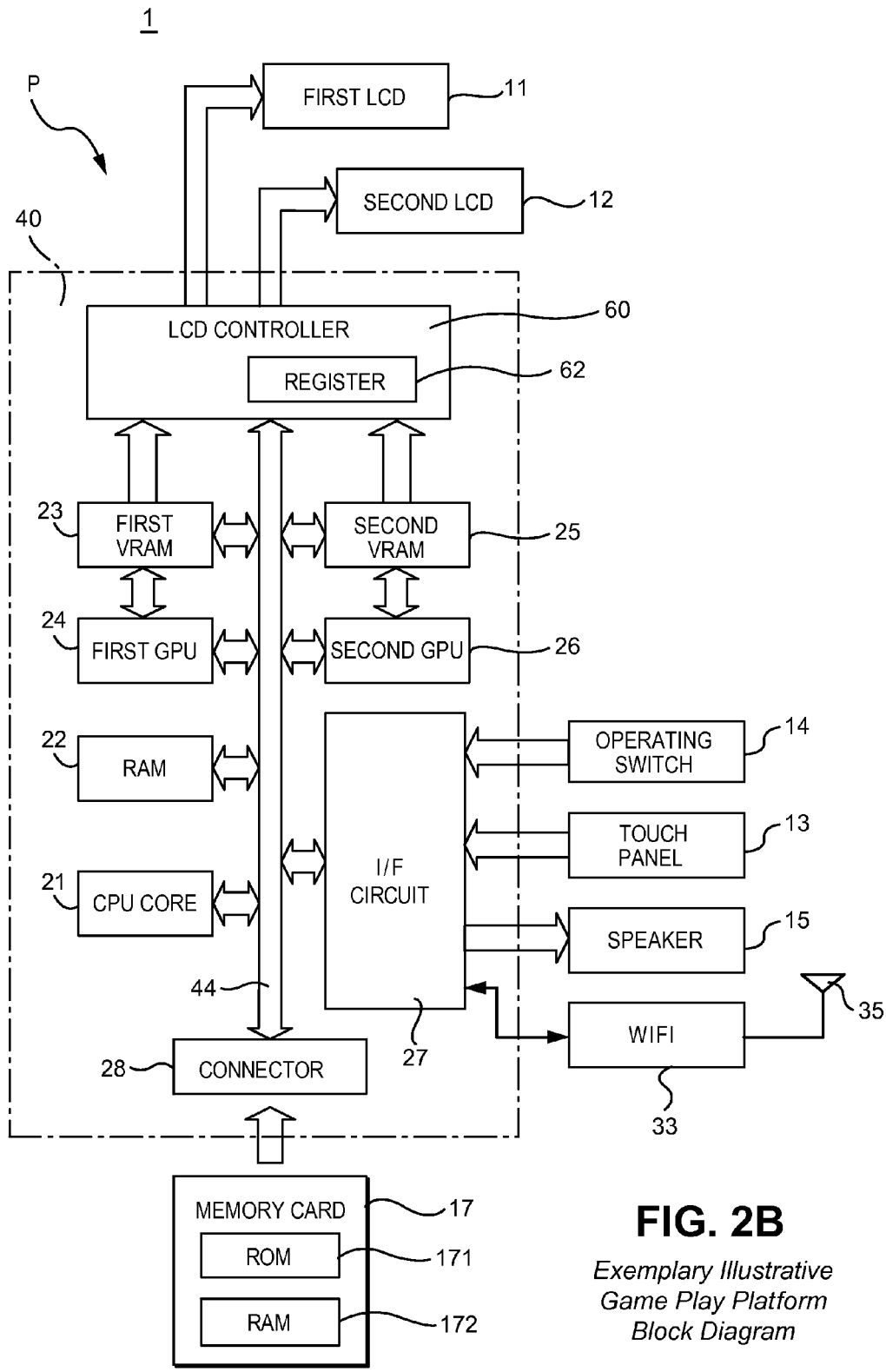
FIG. 2B is a block diagram showing an internal structure of the exemplary game apparatus.

Next, with reference to FIG. 2B, an internal structure of the game apparatus 1 will be described. FIG. 2B is a block diagram showing the internal structure of the game apparatus 1.

In FIG. 2B, an electronic circuit board 40 accommodated in the housing 18 has a CPU core 21 mounted thereon. The CPU core 21 is connected to the connector 28, to be connected to the cartridge 17, via a predetermined bus 44, and the CPU core 21 is also connected to an input/output interface (I/F) circuit 27, a first graphic processing unit (first GPU) 24, a second graphic processing unit (second GPU) 26, and a working RAM (WRAM) 22.

To the connecter 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the game apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dots×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

Figure 2C:
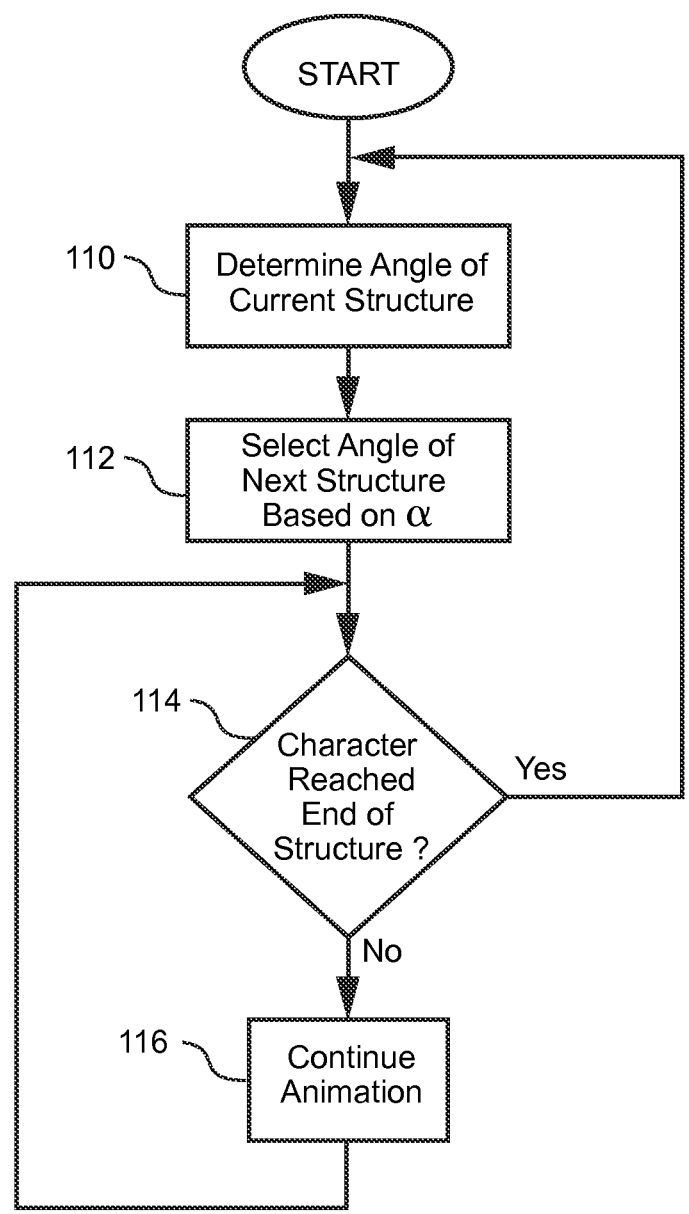
FIG. 2C is a flowchart of an exemplary illustrative non-limiting implementation of software-controlled animation selection functionality.

FIG. 2C is a flowchart of an exemplary illustrative non-limiting implementation of software-controlled virtual tool functionality. In the example shown, software can be executed to control system 1 to perform a video game or other exemplary application. As described above, software may reside on a removable memory card 17 or other storage device insertable into system 1, or it may be provided to the system via other means (e.g., preloading into internal flash or other non-volatile memory, transmission over a wireless connection via WiFi functionality 33, or any other convenient means).

The exemplary FIG. 2C flowchart shows exemplary illustrative non-limiting program control steps that may be stored in the form of instruction within e.g. storage device 17, ROM 171 and/or RAM 172 to be accessed and executed by CPU core 21. In accordance with this exemplary program, the CPU 21 may determine the angle α of the current structure the game characters are travelling on (block 110). Based on this angle α, the CPU may select the angle e.g., relative to virtual gravity direction of the next structure for the game characters to traverse, and then use this selected angle to access a corresponding subset of an animation library containing animation segments that add an additional structure to the current structure at the selected angle (block 112). The CPU 21 may then determine whether the character has reached the end of the structure (block 114). If not, the CPU may control the GPU to continue with animation and display (block 116). If the CPU 21 determines that the character has reached the end of the structure, it may then repeat the first two blocks to determine the angle of the current structure (block 110) and based thereon select the angle for the next structure to be traversed (block 112). The character may continue to traverse endlessly on an endless sequence of additional structures added dynamically with variations in orientation to provide a meandering sequence of structures providing uphills and downhills but which continue to be "safe" for the virtual character to traverse.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A computer-controlled method of providing a user interface comprising:
    with a computer, displaying first virtual structure in a first orientation and floating above a virtual surface in a virtual world;
    with the computer, maintaining a value representing the first orientation;
    with the computer, displaying a virtual object moving on the first virtual structure in the virtual world;
    automatically adding to the virtual world, with the computer while the virtual object is displayed on the first virtual structure, second virtual structure floating above the virtual surface and extending the first virtual structure, including the computer automatically selecting a second orientation for the second virtual structure, the second orientation being different from the first orientation of the first virtual structure and selected by the computer based on the computer-maintained value indicating the first orientation of the first virtual structure; and
    with the computer, displaying the virtual object moving between the first virtual structure and the second virtual structure.

2. The method of claim 1 wherein selecting the second orientation includes orienting the second virtual structure to have an uphill or downhill orientation.

3. The method of claim 2 wherein selecting the second orientation selects orientation of the second virtual structure from a set of predetermined orientations.

4. The method of claim 2 wherein selecting the second orientation selects orientation of the second virtual structure to have an incline of a, 2a or 3a uphill or downhill, wherein a is a predefined angle.

5. The method of claim 1 wherein:
    when the first orientation of the first virtual structure inclines upwardly, the computer selects the second orientation for the second virtual structure to provide a decline of the second virtual structure relative to the first virtual structure; and
    when the first orientation of the first virtual structure inclines downwardly, the computer selects the second orientation for the second virtual structure to provide an incline upwardly of the second virtual structure relative to the first virtual structure.

6. The method of claim 1 wherein the computer adds the second virtual structure to extend the first virtual structure at a time when the virtual object reaches an end of the first virtual structure.

7. The method of claim 1 further comprising:
    with the computer, determining surface angles of the first and second virtual structures;
    with the computer, selecting animations from a predefined set of animations based on the surface angles of the first and second virtual structures; and
    using the selected animations to animate the display of the virtual object moving from the first virtual structure to the second virtual structure.

8. The method of claim 1 wherein the first virtual structure and the second virtual structure meet in an acute or obtuse angle.

9. The method of claim 1 wherein the computer selects the second orientation of the second virtual structure relative to virtual gravity direction in the virtual world.

10. A system for providing a user interface comprising:
    a display;
    a user input device;
    a processor connected to the display and the user input device, the processor being configured to:
        display first virtual structure in a first orientation and floating above a virtual surface in a virtual world;
        display a virtual object moving on the first virtual structure in the virtual world;
        automatically add to the virtual world, while the virtual object is displayed on the first virtual structure, second virtual structure floating above the virtual surface extending the first virtual structure, including the processor maintaining a value indicating the first orientation and automatically selecting a second orientation for the second virtual structure, the second orientation being different from the first orientation of the first virtual structure and selected by the processor based on the value indicating the first orientation of the first virtual structure; and
        display the virtual object moving between the first virtual structure and the second virtual structure.

11. The system of claim 10 wherein selecting the second orientation includes orienting the second virtual structure to have an uphill or downhill orientation.

12. The system of claim 11 wherein selecting the second orientation selects orientation of the second virtual structure from a set of predetermined orientations.

13. The system of claim 11 wherein selecting the second orientation selects orientation of the second virtual structure to have an incline of $\alpha$, $2\alpha$ or $3\alpha$ uphill or downhill, wherein a is a predefined angle.

14. The system of claim 10 wherein the processor is further configured to:
- when the first orientation of the first virtual structure inclines upwardly, selecting the second orientation for the second virtual structure to provide a decline of the second virtual structure relative to the first virtual structure; and
- when the first orientation of the first virtual structure inclines downwardly, selecting the second orientation for the second virtual structure to provide an incline upwardly of the second virtual structure relative to the first virtual structure.

15. The system of claim 10 wherein the processor is configured to add the second virtual structure to extend the first virtual structure at a time when the virtual object reaches an end of the first virtual structure.

16. A non-transitory storage medium for providing a user interface, said storage medium storing instructions for execution by a computer, said instructions comprising:
- instructions displaying first virtual structure in a first orientation and floating above a virtual surface in a virtual world;
- instructions displaying a virtual object moving on the first virtual structure in the virtual world;
- instructions automatically adding to the virtual world, while the virtual object is displayed on the first virtual structure, second virtual structure floating above the virtual surface and extending the first virtual structure, including maintaining a value indicating the first orientation and automatically selecting a second orientation for the second virtual structure, the second orientation being different from the orientation of the first virtual structure and selected based on the value indicating the first orientation of the first virtual structure; and
- instructions displaying the virtual object moving between the first virtual structure and the second virtual structure.

17. The non-transitory storage medium of claim 16 wherein selecting the second orientation includes orienting the second virtual structure to have an uphill or downhill orientation.

18. The non-transitory storage medium of claim 17 wherein selecting the second orientation selects orientation of the second virtual structure from a set of predetermined orientations.

19. The non-transitory storage medium of claim 17 wherein selecting the second orientation selects orientation of the second virtual structure to have an incline of $\alpha$, $2\alpha$ or $3\alpha$ uphill or downhill, wherein a is a predefined angle.

20. The non-transitory storage medium of claim 16 wherein:
- when the first orientation of the first virtual structure inclines upwardly, the second orientation for the second virtual structure is selected to provide a decline of the second virtual structure relative to the first virtual structure; and
- when the first orientation of the first virtual structure inclines downwardly, the second orientation for the second virtual structure is selected to provide an incline upwardly of the second virtual structure relative to the first virtual structure.

21. The non-transitory storage medium of claim 16 wherein the second virtual structure is added to extend the first virtual structure at a time when the virtual object reaches an end of the first virtual structure.

* * * * *